United States Patent Office 2,843,448
Patented July 15, 1958

2,843,448
DYEING AND PRINTING OF CELLULOSE ESTERS AND OF LINEAR AROMATIC POLYESTERS WITH MONO-SULFONATED ANTHRAQUINONES

Ludwig Thummel, Emil Metzger, and Jacques Guenthard, Basel, Switzerland, assignors, by mesne assignments, to Saul & Co., Newark, N. J., as nominee of Fidelity Union Trust Company, executive trustee under Sandoz Trust No Drawing. Application December 29, 1955
Serial No. 556,037

Claims priority, application Switzerland January 5, 1955

18 Claims. (Cl. 8—57)

The present invention relates to the dyeing and printing of cellulose esters and of linear aromatic polyesters.

It is old to dye or to print articles (for example threads, fibers, bands, fabrics, sheets and the like) of cellulose esters and of linear aromatic polyesters with dispersion dyestuffs in the presence of swelling agents for the said esters and polyesters. However, these processes involving the use of dispersed dyestuffs are bound up with various deficiencies. For example, finely divided dyestuffs, such as are employed for the preparation of printing pastes and dyeing and padding liquors, are prepared only with considerable difficulty. Moreover, it is difficult to obtain uniform dyeings of wound articles (e. g. skeins or balls of yarn, etc.) in a circulating liquor with the aid of dispersed dyes, since the wound articles exert a filtering action on the liquor. In addition to the known dyeing and printing processes for cellulose esters by means of dispersed dyes, printing processes for these esters by means of water-soluble dyestuffs are also known. However, dyeing obtained according to these last-named processes generally have only a fair fastness to light in addition to an unsatisfactory fastness to washing; many of them have a poor fastness to light. It is a desideratum in the art, therefore, to develop a simple process for the dyeing and printing of cellulose esters and linear aromatic polyesters with water-soluble dyestuffs, which process is free of the afore-enumerated deficiencies. A primary object of this invention is the embodiment of such a process.

The said object is achieved by the present invention which makes it possible to dye and to print articles of cellulose esters and of linear aromatic polyesters in level (uniform), light-fast and wash-fast shades by the action of water-soluble dyestuffs, as hereinafter defined and which contain a single sulfonic acid group in the molecule thereof, on the said articles in the presence of a reducing agent and, if necessary, in the presence of a swelling agent for the ester or polyester. It is found that, when following this procedure, the dyestuffs drawn onto the material being dyed or printed are free of sulfonic acid groups. In other words, in the dyeing liquor or in the printing paste, the dyestuff splits off its sulfonic acid group by the action of the reducing agent in the heat, is thus converted into water-insoluble form, and draws onto the material in a state of molecular subdivision.

The process of the invention may be characterized as a process for the dyeing and printing of articles of cellulose esters and of linear aromatic polyesters with water-soluble dyestuffs from aqueous dye-baths at elevated temperature or with the aid of aqueous printing pastes and padding liquors, followed by steaming of the prints and paddings, if necessary with the use of pressure. The water-soluble dyestuffs employed in practicing the present invention are acid dyestuffs of the anthraquinone series which contain in the 2-position of the anthraquinone nucleus, as the sole water-solubilizing group, a sulfonic acid group which splits off by the action of a reducing agent at elevated temperature. The dyeing, printing or padding is, according to the invention, carried out in the presence of a reducing agent and, if necessary, in the presence of a swelling agent for the cellulose ester or for the linear aromatic polyester being treated.

The invention further relates to dye-baths, printing pastes and padding liquors which are suitable for use in the process, according to this invention, for the dyeing and printing of articles of cellulose esters and of linear aromatic polyesters. They are characterized by their content of one or more dyestuffs of the type defined in the preceding paragraph, of a reducing agent, and if desired, of a swelling agent for the cellulose ester or for the linear polyester to be treated.

The term cellulose esters, as herein employed, refers primarily to dicellulosepentaacetate (acetate silk) and cellulose triacetate, and the term linear aromatic polyesters refers to high molecular products from polyalkyleneglycols and aromatic dicarboxylic acids, such for example as those which are commercially available as "Dacron" or "Terylene." "Dacron" is a synthetic fiber made by the condensation of dimethyl terephthalate and ethylene glycol. "Terylene" is a synthetic fiber also of the polyethylene terephthalate type. "Dacron" and "Terylene" are trademarks of DuPont and ICI respectively for their polyethylene terephthalate fibers.

The process of the invention can be carried out in diverse ways. Thus, the dyeing of cellulose ester can be carried out in the absence of swelling agents at 80° C. for acetate silk and at 100° C. for cellulose triacetate, while the dyeing of linear aromatic polyester at the boiling point of water requires the presence of a swelling agent for the polyester. Swelling agents which are suitable for use according to the invention comprise, for example, tetraline, trichlorobenzene, benzoic acid, 2-hydroxy-1,1'-diphenyl, 4-hydroxy-1,1'-diphenyl, etc. The dyeing of the linear aromatic polyester can also be carried out at elevated temperature, e. g. at 125° C. and under pressure, for example in a conventional high temperature dyeing apparatus, and in the absence of a swelling agent.

The afore-mentioned dyestuffs, used according to this invention, can also be incorporated, together with the reducing agent, into printing pastes or paddings, which otherwise consist of the usual thickening agents and other conventional ingredients. The prints or paddings on polyester fabrics are preferably steamed at 115–120° C. under enhanced pressure.

The articles of cellulose esters and of linear aromatic polyesters, dyed or printed according to the present invention, are characterized by good dye penetration, i. e. the material is dyed all the way through, and this is the case especially with thick fabrics and wound articles (skeins and the like). The prints and dyeings are of very good uniformity, i. e. they are level, and they are also fast to light and to washing.

Preferred reducing agents for the purposes of the present invention are zinc-formaldehyde-sulfoxylate, sodium-formaldehyde-sulfoxylate and sodium-formaldehyde-bisulfite, the first of these being advantageously employed when dyeing from an aqueous bath; sugar in alkaline medium, for example, glucose, galactose, fructose, lactose; sodium-cellulose-xanthate. Other reducing agents such, for example, as alkali metal hydrosulfite, stannous chloride or zinc dust in ammoniacal medium generally give rise to by-products.

The water-soluble, acid dyestuffs of the anthraquinone series, which are employed according to the present invention, must fulfil the previously-mentioned requirements that they contain in the 2-position of the anthraquinone nucleus a sulfonic acid group which splits off by the action of a reducing agent, and that for the rest they are free of other water-solubilizing groups, and in particular that they are free of additional sulfonic acid groups or carboxy groups. Such dyestuffs belong to the most diverse classes of the anthraquinone series; thus, use may be made of for example salts of 1,4-diamino-anthraquinone-2-sulfonic acid, 1-amino-4-hydroxyanthraquinone-2-sulfonic acid, 1-amino-4-phenylaminoanthraquinone-2-sulfonic acid, 1-hydroxy-4-(4'-methoxy)-phenylaminoanthraquinone-2-sulfonic acid, 4,4'-diamino-1,1'-dianthrimide-2-sulfonic acid, 3'-carbethoxy-4-(2'-cyano)-propylamino-1,9-anthrapyridine-2-sulfonic acid, 3'-carbethoxy - 4 - (4' - methoxy) - phenylamino - 1,9 - anthrapyridine-2-sulfonic acid, 3'-carbethoxy-4-(4'-chloro)-phenylamino-1,9-anthrapyridine-2-sulfonic acid, 1-amino-4 - n - pentyl - sulfonylaminoanthraquinone - 2 - sulfonic acid, etc.

The following examples set forth preferred representative illustrative embodiments of the invention. In these examples the parts are by weight, and the temperatures are in degrees centigrade. When the term "polyester fiber" is employed, this signifies that either Dacron fibers or Terylene fibers may be used.

Example 1

100 parts of polyester fiber are introduced at 60° into a dye-bath consisting of 3000 parts of water, 4 parts of sodium 3'-carbethoxy-4-(2'-cyano)-propylamino-1,9-anthrapyridine-2-sulfonate, 1.5 parts of zinc-formaldehyde-sulfoxylate and 1.5 parts of 2-hydroxy-1,1'-diphenyl, whereupon the bath is heated to boiling in the course of 20 minutes. The material being dyed is maintained in the bath for 60 minutes at this temperature, and is then withdrawn from the bath, rinsed with water and dried. The polyester fiber is dyed a level yellow shade of good fastness to light and to washing.

Example 2

100 parts of polyester fiber are dyed in a high temperature dyeing apparatus under pressure at a temperature above 110° for a period of 30 minutes with a dyeing liquor which consists of 3000 parts of water, 4 parts of potassium 1-hydroxy-4-phenylaminoanthraquinone-2-sulfonate and 1.5 parts of zinc-formaldehyde-sulfoxylate. At the end of this time, the polyester fiber is dyed a level violet shade of good fastness to light and to washing.

Example 3

100 parts of acetate silk are introduced at about 60° into a dye-bath which consists of 3000 parts of water, 4 parts of ammonium 1-hydroxy-4-(4'-methoxy)-phenylaminoanthraquinone-2-sulfonate and 1.5 parts of zinc-formaldehyde-sulfoxylate. The dye-bath is heated to 80° in the course of 20 minutes, and is maintained at this temperature for 60 minutes. The dyed acetate silk is then withdrawn from the bath, rinsed and dried. It is dyed a level, pure violet shade of good fastness to light and to washing.

Example 4

100 parts of cellulose triacetate are introduced at about 60° into a dye-bath which contains 3000 parts of water, 2 parts of lithium 1-amino-4-n-pentylsulfonyl-aminoanthraquinone-2-sulfonate and 1.5 parts of zinc-formaldehyde-sulfoxylate. The dye-bath is heated to 100° in the course of 20 minutes, and is maintained at this temperature for 60 minutes. The dyed cellulose triacetate is then removed from the bath, rinsed with water and dried. There is obtained a level, bright bluish red dyeing of good fastness to water and to washing.

Example 5

100 parts of polyester fiber are introduced at 60° into a dye-bath consisting of 3000 parts of water, 2 parts of sodium 1-amino-4-phenylaminoanthraquinone-2-sulfonate, 1.5 parts of 2-hydroxy-1,1'-diphenyl, 1.5 parts of aqueous sodium hydroxide solution of 30% concentration by weight, and 2 parts of fructose, whereupon the bath is heated to the boiling temperature in the course of 20 minutes. The material being dyed is maintained in the bath for 60 minutes at 100°, then withdrawn from the dye-bath, washed with water and dried. The polyester fiber is dyed a blue shade of good fastness to washing.

Example 6

100 parts of acetate silk are introduced at about 60° into a dye-bath consisting of 3000 parts of water, 2 parts of sodium 1-amino-4-(4'-amino)-phenylaminoanthraquinone-2-sulfonate, 2 parts of glucose and 2 parts of sodium carbonate. The dye-bath is heated to 80° in the course of 20 minutes. After 60 minutes at 80°, the dyed acetate silk is withdrawn from the bath, rinsed and dried. It is dyed a level greenish blue shade of good fastness to washing.

The following table exemplifies additional embodiments of the invention. The fiber being treated is set forth in the second column, the dyestuff employed is recited in the third column, the reducing agent used is indicated in the fourth column, and the color of the obtained dyeing is shown in the last column. Where the fiber is a polyester fiber, the procedure followed is that of any one of Examples 1, 2 and 5; where the fiber is acetate silk, the procedure followed is that of either one of Examples 3 and 6; Example 14 follows the procedure according to Example 4. In every case, a level dyeing of good fastness properties is obtained:

| Example No. | Fiber | Product | Reducing Agent | Color |
|---|---|---|---|---|
| 7 | polyester | sodium 3' - carbethoxy - 4 - phenylamino - 1,9 - anthra-pyridine-2-sulfonate. | zinc-formaldehyde-sulfoxylate. | orange. |
| 8 | do | sodium 1-hydroxy-4-cyanamylaminoanthraquinone-2-sulfonate. | do | red-violet. |
| 9 | do | sodium 1,4-di-p-(methoxy) - ethoxyethoxy - anilino - anthraquinone-2-sulfonate. | galactose | green. |
| 10 | do | sodium 4,4'-diamino-1,1'-di-anthrimide-2-sulfonate. | glucose | gray. |
| 11 | acetate silk | sodium 1-amino-4-hydroxy-anthraquinone-2-sulfonate. | zinc-formaldehyde-sulfoxylate. | red. |
| 12 | do | sodium 1-amino-4-phenyl-aminoanthraquinone-2-sulfonate. | do | blue. |
| 13 | do | sodium 1-amino-4-hydroxyanthraquinone-2-sulfonate. | sodium-cellulose-xanthate. | red. |
| 14 | cellulose triacetate. | sodium 1-amino-4-(4'-hydroxy)-phenylamino-anthraquinone-2-sulfonate. | zinc-formaldehyde-sulfoxylate. | blue. |

Example 15

A spool of 100 parts of polyester fiber is dyed in a high temperature dyeing apparatus as follows: a dye-liquor of 4 parts of sodium 3'-carbethoxy-4-(4'-chloro)-phenylamino-1,9-anthrapyridine-2-sulfonate, 1.5 parts of zinc-formaldehyde-sulfoxylate and 4000 parts of water is circulated in the apparatus, and is quickly brought to boiling temperature. The temperature is then raised so that in the course of 60 minutes 125° has been attained. At the end of this time, the spool is dyed a level orange shade which is fast to light and to washing.

Example 16

A fabric of polyester fiber is printed with a printing paste of the following composition:

20 parts of potassium 3'-carbethoxy-4-(2'-cyano)-propylamino-1,9-anthrapyridine-2-sulfonate
100 parts of thiodiglycol
450 parts of gum thickener
20 parts of sodium-formaldehyde-sulfoxylate
20 parts of potassium carbonate
390 parts of water 1000 parts The print is dried at 50°, then steamed for 30 minutes at normal pressure (temperature 100–105°) and for 10 minutes at a pressure of 1.8 atmospheres (temperature 120°), then rinsed with cold water, soaped at 50° with a fatty alcohol sulfonate, again rinsed and finally dried. There is obtained a level yellow print of good fastness to light and to washing.

Example 17

10 parts of sodium 1-amino-4-phenylaminoanthraquinone-2-sulfonate
100 parts of thiodiglycol
450 parts of gum thickener
80 parts of sodium-formaldehyde-bisulfite
20 parts of potassium carbonate
340 parts of water 1000 parts are worked up into the form of a printing paste. A fabric of polyester fiber is printed with the thus-prepared paste. further treatment is as described in Example 16. There is obtained a bright blue level print of good fastness to light and to washing.

Example 18

A fabric of polyester fiber is padded on the foulard with a padding liquor of the following composition:

10 parts of sodium 1-hydroxy-4-phenylaminoanthraquinone-2-sulfonate
100 parts of thiodiglycol
200 parts of gum thickener
15 parts of sodium-formaldehyde-sulfoxylate
20 parts of potassium carbonate
655 parts of water 1000 parts The padding is steamed and finished after the manner described in Example 16. There is obtained a level violet dyeing of good fastness to light and to washing.

Example 19

A fabric of polyester fiber is padded after the manner set forth in Example 18 with a padding liquor of the following composition:

20 parts of potassium 3'-carbethoxy - 4 - (4'-chloro)-phenylamino-1,9-anthrapyridine-2-sulfonate
100 parts of thiodiglycol
200 parts of gum thickener
80 parts of sodium-formaldehyde-bisulfite
20 parts of potassium carbonate
580 parts of water 1000 parts The padding is treated after the manner described in Example 16. There is obtained a level orange dyeing of good fastness to light and to washing.

In the examples which follow, printing paste ingredients are set forth. These are used, in printing paste form, for the printing of the enumerated fabrics. In each case, the fabric is dried after being printed. In the case of acetate silk fabrics, the print is then steamed for 30 minutes at 100–103° at atmospheric pressure. In the case of fabrics from cellulose triacetate and for polyester fiber, the print is steamed for 30 minutes at 102–104° at atmospheric pressure and for 15 minutes at 110–112° at a pressure of about 1.5 atmospheres. After steaming, the print is in each case rinsed with water, soaped for 3 minutes at 60°, again rinsed and finally dried.

Example 20

20 parts of sodium 3' - carbethoxy - 4 - mesidino - 1,9-anthrapyridine-2-sulfonate
100 parts of thiodiglycol
330 parts of water
450 parts of gum thickener
50 parts of potassium carbonate
50 parts of sodium-formaldehyde-sulfoxylate 1000 parts
Print on polyester fiber: orange.

Example 21

20 parts of sodium 1-amino-4-isopentylsulfonylamino-anthraquinone-2-sulfonate
100 parts of thiodiglycol
375 parts of water
450 parts of gum thickener
50 parts of potassium carbonate
5 parts of galactose 1000 parts
Print on polyester fiber: bluish red.

Example 22

20 parts of sodium 1 - amino - 4 - p - anisidinoanthra-quinone-2-sulfonate
100 parts of thiodiglycol
340 parts of water
450 parts of gum thickener
50 parts of potassium carbonate
40 parts of lactose 1000 parts
Print on polyester fiber: blue.

Example 23

20 parts of sodium 1-amino - 4 - (4' - amino)-phenyl-aminoanthraquinone-2-sulfonate
100 parts of thiodiglycol
340 parts of water
450 parts of gum thickener
50 parts of potassium carbonate
40 parts of glucose 1000 parts
Print on polyester fiber: greenish blue.

Example 24

20 parts of sodium 4,4'-diamino-1,1'-dianthrimide-2-sulfonate
100 parts of thiodiglycol
260 parts of water
450 parts of gum thickener
50 parts of potassium carbonate
120 parts of dextrine 1000 parts Print on polyester fiber: gray.

Example 25

20 parts of sodium 1-amino-4-hydroxyanthraquinone-2-sulfonate
100 parts of Tetracarnit
375 parts of water
450 parts of gum thickener
50 parts of potassium carbonate
5 parts of Hydrosulfit conc. (sodium hyposulfite)

1000 parts

Print on polyester fiber: red.

Example 26

20 parts of sodium 1-hydroxy-4-phenylaminoanthraquinone-2-sulfonate
80 parts of thiodiglycol
20 parts of Tetracarnit
370 parts of water
450 parts of gum thickener
30 parts of potassium carbonate
30 parts of zinc dust 1000 parts Print on polyester fiber: violet.

Example 27

20 parts of sodium 1-aminoanthraquinone-2-sulfonate
100 parts of thiodiglycol
360 parts of water
450 parts of gum thickener
50 parts of potassium carbonate
20 parts of sodium-formaldehyde-sulfoxylate 1000 parts Print on acetate silk: orange.

Example 28

20 parts of sodium 1-amino-4-phenylaminoanthraquinone-2-sulfonate
100 parts of thiodiglycol
320 parts of water
450 parts of gum thickener
50 parts of potassium carbonate
60 parts of fructose 1000 parts Print on acetate silk: blue.

Example 29

20 parts of sodium 3'-carbethoxy-4-(p-methoxy)-phenylamino-1,9-anthrapyridine-2-sulfonate
100 parts of thiodiglycol
360 parts of water
450 parts of gum thickener
50 parts of potassium carbonate
20 parts of sodium-formaldehyde-sulfoxylate 1000 parts Print on cellulose triacetate: orange.

Example 30

20 parts of sodium 1-hydroxy-4-(p-methoxy)-phenylaminoanthraquinone-2-sulfonate
100 parts of thiodiglycol
360 parts of water
450 parts of gum thickener
50 parts of potassium carbonate
20 parts of glucose 1000 parts Print on cellulose triacetate: violet.

Example 31

20 parts of sodium 1-amino-4-(p-methoxy)-phenylaminoanthraquinone-2-sulfonate
80 parts of thiodiglycol
20 parts of Tetracarnit
360 parts of water
450 parts of gum thickener
50 parts of potassium carbonate
20 parts of sodium hyposulfite 1000 parts Print on cellulose triacetate: blue.

In the foregoing examples where gum thickener is used, it may be gum arabic, gum tragacanth and, above all, crystal gum.

"Tetracarnit" is an agent for dissolving dyestuffs and for levelling on the basis of heterocyclic bases. "Tetracarnit" is a trademark of Sandoz.

Having thus disclosed the invention, what is claimed is:

1. A process for dyeing and printing articles of cellulose esters and of linear aromatic polyesters, which comprises bringing said articles into contact with a water-soluble acid anthraquinone dyestuff containing a sulfonic acid group in the 2-position of the anthraquinone nucleus as the sole water-solubilizing group, in aqueous medium and at raised temperature and in the presence of a reducing agent selected from the group consisting of zinc-formaldehyde-sulfoxylate, sodium-formadlehyde-bisulfite, sodium-formaldehyde-sulfoxylate, sodium-cellulose-xanthate, a mixture of sodium hyposulfite and an alkali metal carbonate, a mixture of a reducing sugar and an alkali metal carbonate, a mixture of a reducing sugar and an alkali metal hydroxide and a mixture of zinc dust and an alkali metal carbonate, whereby the 2-positioned sulfonic acid group is split off and the dyestuff is drawn onto the said articles in insolubilized form and in a state of molecular subdivision.

2. A process according to claim 1, wherein the reducing agent is zinc-formaldehyde-sulfoxylate.

3. A process according to claim 1, wherein the reducing agent is a reducing sugar.

4. A process according to claim 1, wherein the reducing agent is glucose.

5. A process according to claim 1, wherein acetate silk is dyed from an aqueous dye-bath at a temperature of about 80° C.

6. A process according to claim 1, wherein cellulose triacetate is dyed from an aqueous dye-bath at a temperature of about 100° C.

7. A process according to claim 1, wherein a linear aromatic polyester material is dyed at a temperature of about 100° C. in the presence of a swelling agent for the said polyester material.

8. A process according to claim 1 wherein the said dyestuff is comprised within an aqueous printing paste which also comprises said reducing agent, said paste is printed onto the material being treated and the thus-obtained print is steamed.

9. A process according to claim 8, wherein said reducing agent is sodium-formaldehyde-sulfoxylate.

10. A process according to claim 8, wherein said reducing agent is a reducing sugar.

11. A process according to claim 8, wherein said reducing agent is glucose.

12. A process according to claim 1 wherein said dyestuff is comprised within a padding liquor which also comprises said reducing agent, said padding liquor is applied to the material being treated and the thus-obtained print is steamed.

13. A process according to claim 12, wherein said reducing agent is sodium-formaldehyde-sulfoxylate.

14. A process according to claim 12, wherein said reducing agent is a reducing sugar.

15. A process according to claim 12, wherein said reducing agent is glucose.

16. A process according to claim 8, wherein said material is acetate silk and the print is steamed at about 100° C.

17. A process according to claim 8, wherein said material is cellulose triacetate and the print is steamed at above 100° C.

18. A process according to claim 8, wherein said material is a linear aromatic polyester and the print is steamed at above 100° C.

References Cited in the file of this patent

UNITED STATES PATENTS

| | | |
|---|---|---|
| 1,833,250 | Grossmann | Nov. 24, 1931 |
| 1,904,815 | Bally | Apr. 28, 1933 |

FOREIGN PATENTS

| | | |
|---|---|---|
| 358,033 | Great Britain | Sept. 28, 1931 |
| 965,896 | France | Feb. 22, 1950 |